US005379986A

United States Patent [19]

Perez et al.

[11] Patent Number: 5,379,986

[45] Date of Patent: Jan. 10, 1995

[54] STAKE EXTRACTOR DEVICE WITH A DOUBLE-HANDED CROSS HANDLE

[76] Inventors: Alain M. Perez; Ignacio Perez, both of 2835 SW. 6th St., Miami, Fla. 33135

[21] Appl. No.: 103,868

[22] Filed: Aug. 9, 1993

[51] Int. Cl.[6] ........................ B23P 19/04; B66F 15/00

[52] U.S. Cl. ........................................ 254/19; 29/254

[58] Field of Search ............... 254/18, 19, 30; 81/463; 29/254, 255

[56] References Cited

U.S. PATENT DOCUMENTS

| | | | |
|---|---|---|---|
| 103,330 | 5/1870 | Heusser | 254/19 |
| 1,747,053 | 2/1930 | Colerick . | |
| 2,754,585 | 7/1956 | Green . | |
| 2,779,089 | 1/1957 | Allen . | |
| 3,169,010 | 2/1965 | Crawford, Jr. . | |
| 3,211,240 | 10/1965 | Smitter et al. . | |
| 3,280,455 | 10/1966 | Smith | 29/254 |
| 3,529,497 | 9/1970 | Brooks . | |
| 3,791,012 | 2/1974 | Jenkin . | |
| 4,034,594 | 7/1977 | Morgan . | |
| 4,283,827 | 8/1981 | Abel | 29/254 |
| 4,454,792 | 6/1984 | Burris . | |
| 4,669,341 | 6/1987 | Small . | |

*Primary Examiner*—Robert C. Watson

*Attorney, Agent, or Firm*—John R. Flanagan

[57] ABSTRACT

A stake extractor device includes an elongated inner tube having a square cross-section and upper and lower ends, an elongated outer tube being shorter in length than the inner tube, the outer tube having a square cross-section and being fitted over the inner tube and slidable therealong between the upper and lower ends thereof, an upper stop element attached on the upper end of the inner tube so as to limit upward movement of the outer tube relative to the lower tube, a lower coupler element attached on the lower end of the inner tube so as to limit downward movement of the outer tube relative to the lower tube and being configured to receive a head portion of an object to be pulled, and handle members secured at inner ends to the outer tube next to an upper end thereof and extending in opposite directions from and in transverse relation to the outer tube. The handles are used for gripping by both hands of a user to move the outer tube relative to the inner tube in order to pull the object.

14 Claims, 1 Drawing Sheet

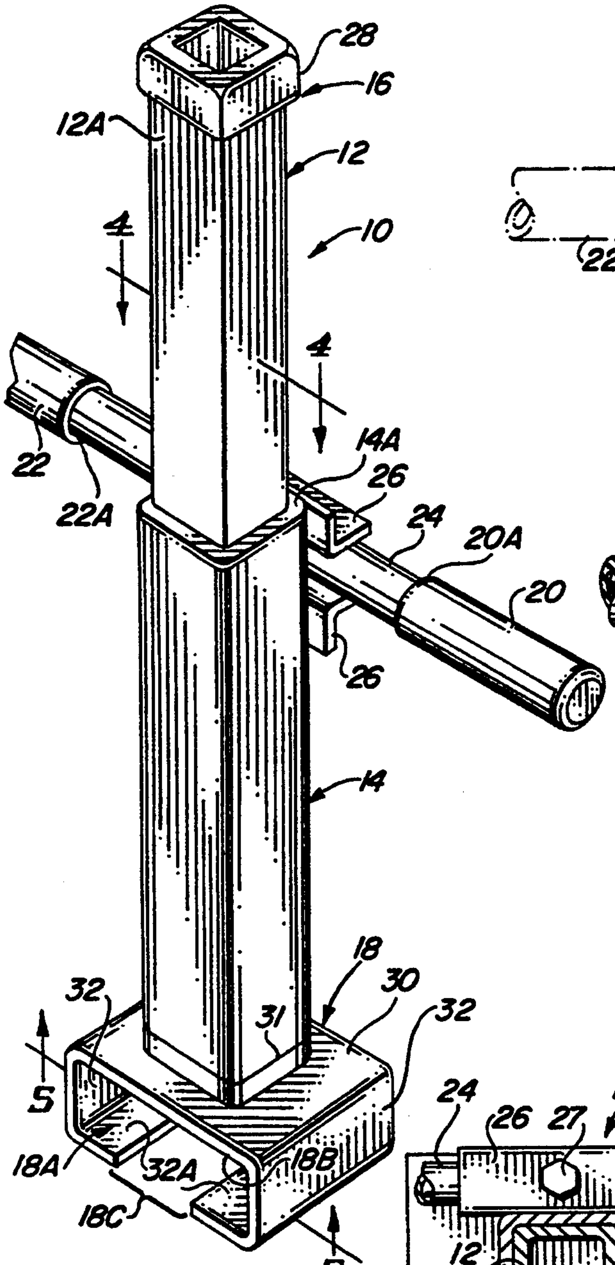
FIG. 1
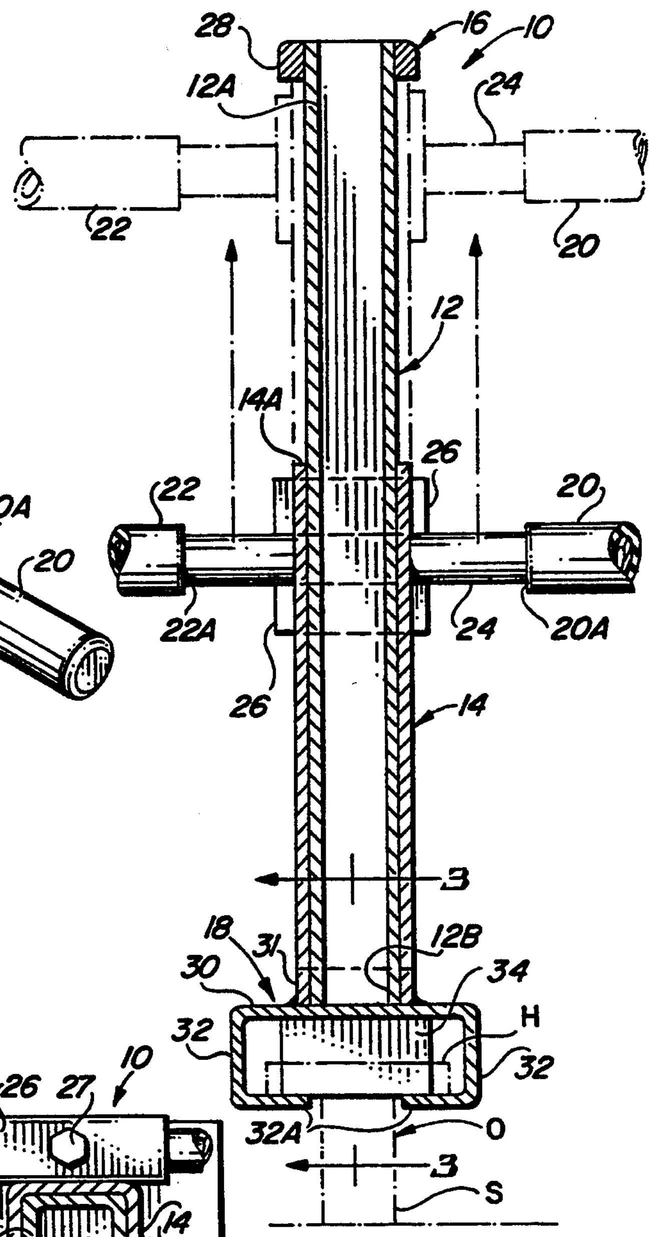
FIG. 2
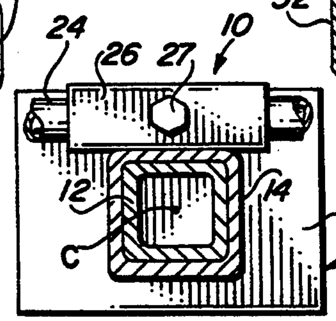
FIG. 4
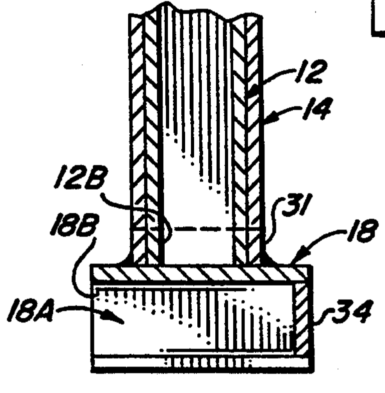
FIG. 3
FIG. 5
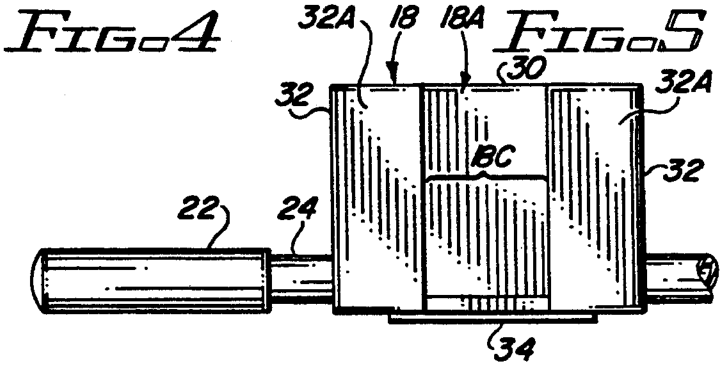

STAKE EXTRACTOR DEVICE WITH A DOUBLE-HANDED CROSS HANDLE

BACKGROUND OF THE INVENTION

1Field of the Invention

The present invention generally relates to stake extracting tools and devices and, more particularly, is concerned with a stake extractor device having a double-handed cross handle.

2. Description of the Prior Art

The requirement to remove or extract stakes, large nails and other rigid objects from structures, such as the ground, roadways or walls, arises quite frequently in construction work, carpentry, earth work and the like. Oftentimes, these extractions demand the ability to apply a large force to remove the object. For example, long rusty stakes and nails which have been embedded in a structure for a long time are particularly difficult to remove without the possibility of using grease or other lubrication unless considerable force can be delivered to remove them.

A number of different devices to pull out nails or brads, to remove grease caps, tent stakes, trap stakes and so forth, have been proposed in the prior patent art. Representative examples of these devices are the ones disclosed in U.S. Pat. Nos. to Colerick (1,747,053), Allen (2,779,089), Crawford, Jr. (3,169,010), Brooks (3,529,497), Jenkin (3,791,012), Burris (4,454,792) and Small (4,669,341).

Colerick discloses a nail and staple puller which includes an elongated rod having a tool on its lower end and a hammer slidably mounted thereon for use to force the tool either downwardly or upwardly. Allen discloses a puller tool which includes an elongated shank, an handle attached to one end of the shank, a clamp attached to an opposite end thereof, and a manually operated hammer slidably mounted along the shank.

Crawford, Jr. discloses a nail puller including a hammer slidably mounted on the elongated member and having a tool at one end. Brooks discloses a dowel removing tool including a dowel gripping member mounted on an end of a rod and a hammer slidably mounted along the rod.

Jenkins discloses a traction applying tool which includes a guide rod with a gripping tool mounted at one end and an impact member slidably mounted along the rod. Small discloses an extraction device similar to that of Jenkins above. Burris discloses a hand tool for pulling tent stakes which includes a claw foot having a standing bar and a sliding bar with a handle at one end. The sliding bar is slidably disposed along one side of the standing bar by square straps. The standing bar and sliding bar have square cross-sections.

However, a common drawback of the above-described devices is that they are basically one-hand operated. Therefore, the impact force is too small to remove many objects which are strongly fixed in the structure. As a result, a need still exists for a device which will deliver a higher level of impact force so as to permit the removal of such firmly fixed objects.

SUMMARY OF THE INVENTION

The present invention provides a stake extractor device designed to satisfy the aforementioned need. The stake extractor device of the present invention employs a double-handed cross handle attached to a hammer member of the device. The double-handed handle or grip on the device provides the user with the capability of being able to manually accelerate the hammer member to a high enough velocity so that the impact force will be sufficient to pull most objects. Conversely, it is also possible to use the stake extractor of the present invention to drive objects into the ground or structure.

Accordingly, the present invention is directed to a stake extractor device which comprises: (a) an elongated inner tube having upper and lower ends; (b) an elongated outer tube fitted over said inner tube and slidable along between said upper and lower ends of said inner tube; (c) stop means for limiting upward movement of the outer tube relative to the lower tube; (d) means for coupling the lower end of the inner tube to a head portion of an object to be pulled; and (e) a pair of handle members secured to the outer tube and disposed on opposite lateral sides thereof, the handle members being adapted for gripping by both hands of a user to move the outer tube relative to the inner tube and against the stop means in order to pull an object coupled by the coupling means to the lower end of the inner tube. Also, the handle members extend in opposite directions from and in transverse relation to the outer tube.

More particularly, the inner and outer tubes have complementary rectangular, preferably square, cross-sectional configurations. The outer tube is shorter in length than said inner tube. The stop means is an upper stop element attached on the upper end of the inner tube.

Further, the coupling means is a lower coupler element attached on the lower end of the inner tube and being configured to receive a head portion of an object to be pulled. The coupling means includes a lower coupler element having a C-shaped configuration and being open at a pair of opposite ends. The coupling means includes a closure plate secured to the coupler element across one of the opposite ends. The lower coupler element also has an elongated slot extending between the opposite ends of the lower coupler element. The lower coupler element further includes a lower stop for limiting downward movement of the outer tube relative to the lower tube.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of the stake extractor device of the present invention.

FIG. 2 is a longitudinal sectional view of the stake extractor device of FIG. 1.

FIG. 3 is a fragmentary sectional view of the stake extractor device taken along line 3—3 of FIG. 2.

FIG. 4 is an enlarged cross-sectional view of the stake extractor device taken along line 4—4 of FIG. 1.

FIG. 5 is an enlarged fragmentary bottom plan view of the stake extractor device as seen along line 5—5 of FIG. 1.

DETAILED DESCRIPTION OF THE INVENTION

Referring to the drawings and particularly to FIGS. 1 and 2, there is illustrated a stake extractor device, generally designated 10, of the present invention. Basically, the stake extractor device 10 includes an elongated inner hollow tube 12, an elongated outer hollow tube 14, an upper stop element 16 attached on an upper end 12A of the inner tube 12, a lower coupler element 18 attached on a lower end 12B of the inner tube 12, and a pair of handle members 20, 22 secured at inner ends 20A, 22A to the outer tube 14.

The inner and outer tubes 12, 14 preferably have concentric rectangular, and preferably square, cross-sectional configurations. The outer tube 14 is larger in cross-sectional size and shorter in length than the inner tube 12 such that the outer tube 14 fits over the inner tube 12 and is slidable therealong between the upper and lower ends 12A, 12B of the inner tube 12. The rectangular configuration of the inner and outer tubes 12, 14 prevents the outer tube 14 from rotating relative to the inner tube 12 and thus limits the outer tube 14 solely to reciprocal movement along the inner tube 12.

In the illustrated embodiment, the handle members 20, 22 are mounted on a common bar 24 being secured between a pair of brackets 26 by a fastener 27. The brackets 26 are rigidly fixed on one side of the upper end 14A of the outer tube 14 and mount the common bar 24 and handle members 20, 22 to the outer tube 14 at the one lateral side thereof being offset from a longitudinal centerline C of the outer tube 14, as seen in FIG. 4. The common bar 24 disposes the handle members 20, 22 on the opposite lateral sides of the outer tube 14 where they are adapted to be gripped by both hands of a user to move the outer tube 14 relative to the inner tube 12. Specifically, the pair of handle members 20, 22 extend in opposite directions from and in transverse relation to the longitudinal extent of the outer tube 14. The handle members 20, 22 can be connected to the outer tube 14 in other ways, one example of which is by being threadably screwed into internally-threaded collars fixed on opposite sides of the upper end of the outer tube 14.

The outer tube 14, functioning as a hammer head, is pulled upwardly and thereby driven against the upper stop element 16 on the upper end 12A of the inner tube 12 which limits and stops the upward movement of the outer tube 14 relative to the lower tube 12. The upwardly-directed force is transmitted through the upper stop element 16, then downwardly through the inner tube 12, to the lower coupling element 18 being connected to the lower end 12B of the inner tube 12. The upper stop element 16 is in the form of an annular square-shaped collar 28 rigidly attached to the upper end 12A of the inner tube 12. The annular collar 28 protrudes outwardly beyond the sides of the inner tube 12.

Ultimately, the upwardly-directed force is applied to an elongated object O, such as a stake or nail, embedded in a structure, as seen in phantom in FIG. 2, and being coupled to the lower coupling element 18. The lower coupler element 18 attached on the lower end 12B of the inner tube 12 is configured to receive an enlarged head portion H of the object O to be pulled. The lower coupler element 18 also includes a top plate 30 and an annular ring 31 fixed thereon functioning as a lower stop for limiting downward movement of the outer tube 14 relative to the lower tube 12. The lower coupler element 18 also has a pair of opposite side flanges 32 rigidly attached to a pair of opposite edges of the top plate 30 and extending downwardly and inwardly therefrom. The top plate 30 and side flanges 32 have an overall C-shaped configuration and define a channel 18A below the top plate 30 and between the opposite flanges 32 which is open at opposite ends 18B. The side flanges 32 define an elongated slot 18C extending between and opening at the opposite ends 18B and into the channel 18A. The channel 18A, open ends 18B and slot 18C adapt the coupler element 18 to receive the enlarged head portion H of the object O within the channel 18A with opposite edges of the head portion H resting upon the inturned portions 32A of the side flanges 32. A shaft portion S of the object O to be pulled extend downwardly through the slot 18C. The lower coupler element 18 also has a closure plate 34 secured thereto across one of the opposite ends 18B of the channel 18A and of the slot 18C so as to prevent inadvertent removal of the head portion H of the object O through the one end 18B. More particularly, as can be observed and understood in FIGS. 1 and 2, the elongated slot 18C is narrower in width than the elongated channel 18A so as to adapt the lower coupler element 18 to receive the enlarged head portion H of the object O to be pulled through the elongated channel 18A and to receive the shaft portion S of the object O, being smaller in cross-sectional size than the enlarged head portion H, through the elongated slot 18C. The closure plate 34 secured to the coupler element 18 across one of the opposite open ends 18B blocks the one open end 18B of the elongated slot 18C and channel 18A and thus prevents removal of the enlarged head portion H and shaft portion S of the object O therethrough.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A stake extractor device, comprising:

(a) an elongated inner tube having upper and lower ends;

(b) an elongated outer tube fitted over said inner tube and slidable therealong between said upper and lower ends of said inner tube;

(c) stop means for limiting upward movement of said outer tube relative to said lower tube;

(d) means for coupling said lower end of said inner tube to an object to be pulled, said coupling means including lower coupler element having a C-shaped configuration formed by a top portion and a pair of opposite side portions defining an elongated channel extending between a pair of opposite open ends of said lower coupler element and a pair of edge portions on said opposite side portions extending toward one another and defining an elongated slot communicating with said elongated channel and extending between said opposite open ends of said lower coupler element, said elongated slot being narrower in width than said elongated channel so as to adapt said lower coupler element to receive an enlarged head portion of an object to be pulled through said elongated channel and to receive a shaft portion of the object being smaller in cross-sectional size than the enlarged head portion through said slot, said coupling means also including a closure element secured to said coupler element so as to extend across one of said opposite open ends and block said one end of said elongated slot and channel and prevent removal of the enlarged head portion and shaft portion therethrough; and (e) handle means secured to said outer tube and disposed on opposite lateral sides thereof, said handle means being adapted for gripping by both hands of a user to move said outer tube relative to said inner tube and against said stop means in order to pull an object coupled by said coupling means to said lower end of said inner tube.

2. The device of claim 1 wherein said inner tube has a rectangular cross-sectional configuration.

3. The device of claim 1 wherein said outer tube is shorter in length than said inner tube.

4. The device of claim 1 wherein said outer tube has a rectangular cross-sectional configuration.

5. The device of claim 1 wherein said stop means is an upper stop element attached on said upper end of said inner tube.

6. The device of claim 1 wherein said coupling means is a lower coupler element attached on said lower end of said inner tube and being configured to receive a head portion of an object to be pulled.

7. The device of claim 1 wherein said lower coupler element includes a lower stop for limiting downward movement of said outer tube relative to said lower tube.

8. The device of claim 1 wherein said handle means includes a pair of handle members secured to said outer tube, said handle members being disposed on opposite lateral sides thereof and extending in opposite directions from the outer tube.

9. The device of claim 8 wherein said handle members extend in transverse relation to the outer tube.

10. A stake extractor device, comprising:

(a) an elongated inner tube having a rectangular cross-sectional configuration and upper and lower ends;

(b) an elongated outer tube being shorter in length than said inner tube, said outer tube having a rectangular cross-section and being fitted over said inner tube and slidable therealong between said upper and lower ends thereof;

(c) an upper stop element attached on said upper end of said inner tube so as to limit upward movement of said outer tube relative to said lower tube;

(d) a lower coupler element attached on said lower end of said inner tube so as to limit downward movement of said outer tube relative to said lower tube and being configured to receive a portion of an object to be pulled, said lower coupler element having a C-shaped configuration formed by a top portion and a pair of opposite side portions defining an elongated channel extending between a pair of opposite open ends of said lower coupler element and a pair of edge portions on said opposite side portions extending toward one another and defining an elongated slot communicating with said elongated channel and extending between said opposite open ends of said lower coupler element, said elongated slot being narrower in width than said elongated channel so as to adapt said lower coupler element to receive an enlarged head portion of an object to be pulled through said elongated channel and to receive a shaft portion of the object being smaller in cross-sectional size than the enlargedhead portion through said slot;

(e) a closure element secured to said lower coupler element so as to extend across one of said opposite open ends and block said one end of said elongated slot and channel and prevent removal of the enlarged head portion and shaft portion therethrough; and (f) a pair of handle members secured to said outer tube and extending in opposite directions from and in transverse relation to said outer tube, said handle members being adapted for gripping by both hands of a user to move said outer tube relative to said inner tube and against said stop means in order to pull an object coupled by said coupling means to said lower end of said inner tube.

11. The device of claim 10 wherein said inner tube has a square cross-sectional configuration.

12. The device of claim 13 wherein said outer tube has a square cross-sectional configuration.

13. A stake extractor device, comprising:

(a) an elongated inner tube having upper and lower ends;

(b) an elongated outer tube fitted over said inner tube and slidable therealong between said upper and lower ends of said inner tube;

(c) stop means for limiting upward movement of said outer tube relative to said lower tube;

(d) means for coupling said lower end of said inner tube to an object to be pulled; and (e) handle means secured to said outer tube and extending past one lateral side of said outer tube and being offset from a longitudinal centerline of said outer tube, said handle means including a pair of handle members extending transversely in opposite directions from said outer tube and being adapted for gripping by both hands of a user to move said outer tube relative to said inner tube and against said stop means in order to pull an object coupled by said coupling means to said lower end of said inner tube.

14. The device of claim 13 wherein said handle means also includes bracket means fixedly attached to said one lateral side of said outer tube and mounting said handle means.

* * * * *